US011726067B1

(12) United States Patent
Cheng et al.

(10) Patent No.: US 11,726,067 B1
(45) Date of Patent: Aug. 15, 2023

(54) DETECTION SYSTEM AND A METHOD FOR DETECTING STRUCTURAL CHANGE WITH A SUBSTRATE

(71) Applicant: Logistics and Supply Chain MultiTech R&D Centre Limited, Pok Fu Lam (HK)

(72) Inventors: Chun Hung Cheng, Pok Fu Lam (HK); Ho Lam, Pok Fu Lam (HK); Ka Leung Lau, Pok Fu Lam (HK)

(73) Assignee: Logistics and Supply Chain MultiTech R&D Centre Limited

( * ) Notice: Subject to any disclaimer, the term of this patent is extended or adjusted under 35 U.S.C. 154(b) by 0 days.

(21) Appl. No.: 17/692,626

(22) Filed: Mar. 11, 2022

(51) Int. Cl.

| | |
|---|---|
| ***G01N 29/12*** | (2006.01) |
| ***G01N 29/44*** | (2006.01) |
| ***G01N 17/00*** | (2006.01) |
| ***G01N 29/04*** | (2006.01) |

(52) U.S. Cl.
CPC ............ *G01N 29/12* (2013.01); *G01N 17/00* (2013.01); *G01N 29/045* (2013.01); *G01N 29/4436* (2013.01); *G01N 2291/0258* (2013.01)

(58) Field of Classification Search
CPC .... G01N 29/12; G01N 17/00; G01N 29/4436; G01N 2291/0258; G01N 29/045
USPC ............................................................ 73/579
See application file for complete search history.

(56) References Cited

FOREIGN PATENT DOCUMENTS

| | | | | |
|---|---|---|---|---|
| CN | 105136350 A | * 12/2015 | | |
| CN | 107747900 A | * 3/2018 | ............... | G01B 7/00 |
| CN | 115711808 A | * 2/2023 | | |
| WO | WO-2009000919 A2 | * 12/2008 | .......... | G01M 5/0033 |

* cited by examiner

*Primary Examiner* — Lisa M Caputo
*Assistant Examiner* — Rose M Miller
(74) *Attorney, Agent, or Firm* — Renner, Kenner, Greive, Bobak, Taylor & Weber

(57) ABSTRACT

A detection system (100) and a method for identifying structural change (300) with a substrate (200) includes a sensor (101) configured to resonate at variable frequencies, the resonant frequency of the sensor changing in response to structural change in the substrate, a detector (102) located in proximity to the sensor for detecting the resonant frequency of the sensor, and a receiving device (103) in communication with the detector for receiving information output by the detector, an analyzing device (108) in communication with the receiving device for and interpreting information output by the receiving device. The sensor includes an engagement surface for engaging the substrate. The detector is located on the sensor and away from the engagement surface in such a way that the sensor and the detector are arranged to form a laminated structure.

11 Claims, 2 Drawing Sheets

100
105
102
101
Part A
104
corrosion
106
200
300
200
108
103

DETECTION SYSTEM AND A METHOD FOR DETECTING STRUCTURAL CHANGE WITH A SUBSTRATE

TECHNICAL FIELD

The present invention relates to a detection system for detecting structural change with a substrate, and particularly, but not exclusively, for detecting corrosion in a flexible barrier.

BACKGROUND OF THE INVENTION

The detection and identification of structural anomalies and imperfections in substrates is important for quality control, preventative maintenance and safety considerations. These abnormalities and imperfections can be understood as structural change including cracks and fractures. The substrate may include a wall, a pipe, a panel or a frame and may be made from a number of known materials, including metal or composite materials. The substrates are subjected to a variety of external and internal wearing that brings about the structural change that may affect the integrity of the substrate.

To detect the structural change, one way would be for workers to visit the substrate and perform tests in situ. This is a periodic rather than continuous monitoring of the substrate. It is not ideal for being time and resources consuming.

The invention seeks to eliminate or at least to mitigate such shortcomings by providing a new or otherwise improved detection system for and a related method of detecting structural changes with a substrate.

SUMMARY OF THE INVENTION

According to the invention, in a first aspect of the invention, there is provided a detection system for identifying structural change with a substrate, which comprises a sensor configured to resonate at variable frequencies, the resonant frequency of the sensor changes in response to structural change in said substrate; a detector located in proximity to the sensor for detecting the resonant frequency of the sensor; and a receiving device in communication with the detector for receiving information output by the detector; an analyzing device in communication with the receiving device for and interpreting information output by the receiving device. The sensor includes an engagement surface for engaging said substrate, the detector is located on the sensor and away from the engagement surface in such a way that the sensor and the detector are arranged to form a laminated structure.

Preferably, the engagement surface of the sensor engages said substrate via a layer of insulation. More preferably, the sensor, the detector and the layer of insulation are contained in a housing. It is preferable that the analyzing device is pre-equipped with information for interpretation of the output from the detector. Yet more preferably, the substrate comprises a flexible barrier and the structural change comprises corrosion of the flexible barrier. Advantageously, the housing is placed on a support which is placed in direct contact with the substrate. More advantageously, the sensor comprises an antenna sensor.

In a second aspect of the invention, there is provided a method of detecting a structural change in substrate, comprising the steps of:

- providing the detection system as claimed in any one of claims 1 to 7;
- detecting the resonant frequency of the sensor by the detector;
- transmitting detected information from the detector to the receiving device;
- preparing the analyzing device by installing a set of reference data; and
- identifying any change in the resonant frequency of the sensor by the analyzing device.

Preferably, the analyzing device operatively interprets the change in resonant frequency by comparing it with the reference data, thereby obtaining information of the structural change. More preferably the information of the structural change includes at least one of position and magnitude of the structural change. Yet more preferably the step of providing the detection system includes placing two or more laminated structures on the substrate at specific intervals apart.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
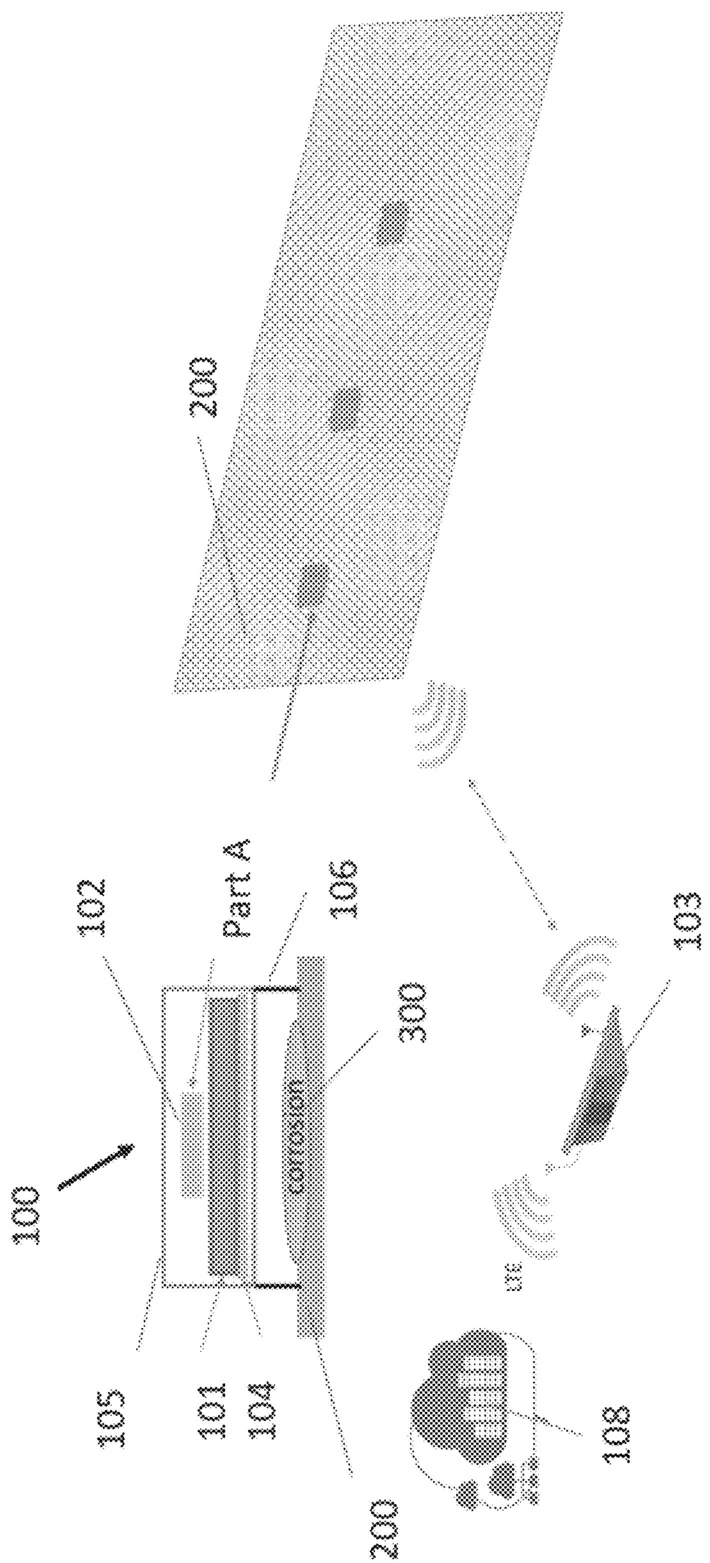
FIG. 1 is a schematic diagram of a detection system.
Figure 2:
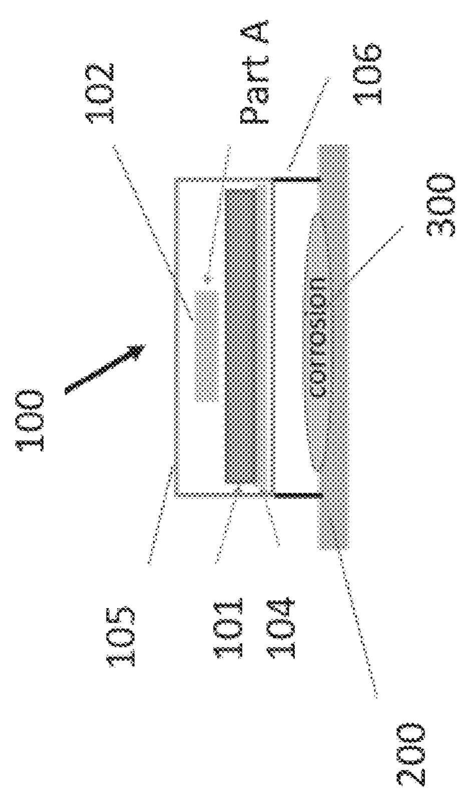
FIG. 2 is an enlarged view of Part A in FIG. 1.

Referring to FIGS. 1 and 2, there is shown an embodiment of a detection system 100. The detection system 100 is configured to detect structural change 300 in a substrate 200. The structural change 300 includes but not limited to abnormalities, and deformations such as corrosion and cracks. The substrate 200 can be any solid formation such as a wall of a structure 200, a flexible barrier such as a net, or the wall of a pipe.

In the detection system 100, there is a sensor 101 which is capable of resonating at different frequencies. The resonant frequency of the sensor 101 varies in relation to the condition of the substrate 200, where detection is desired. In other words, the sensor 101 resonates at a frequency that reflects or depends on the condition of the substrate 200. In a preferred embodiment, the sensor 101 is an antenna sensor which is an electronic device with dual functionality for communicating and sensing. The advantage of using an antenna sensor is that it has a minimum number of components. It is space efficient. It also has low energy consumption. A change in the resonant frequency of the sensor 101 reflects a change in the structure or condition of the substrate 200. The magnitude of the change is in relation to the magnitude or extent of the structural change 300 in the substrate 200.

The resonant frequency of the sensor 101 is detected by a detector 102 located in proximity to the sensor 101. In a preferred embodiment, the detector 102 is placed on top of the sensor 101 to form a laminated structure. The detector 102 is a frequency detector that detects and captures the resonant frequency of the sensor 101. The detected and captured frequency is then transmitted to a receiving device 103. Any changes in the resonant frequency will also be detected, captured and transmitted.

The receiving device 103, which acts as a terminal, is in communication with the detector 102 via wireless communication technology such as LoRa that offers low power consumption. The detector 102 transmits all the detected resonant frequencies to the receiving device 103. An analyzing device, preferably in the form of an analyzing server 108, is in communication with the receiving device 103 via wireless communication technology such as LTE (Long-Term Evolution). The analyzing server 108 is pre-equipped with reference information for interpretation of the output from the receiving device 103. The detected frequencies are compared with the pre-equipped reference information so as to come to a conclusion on the magnitude or extent of the structural change 300.

The sensor 101 has an engagement surface on which the sensor 101 is placed onto the substrate 200. The detector 102 is fixed to the sensor 101 on another surface thereof, which is on the opposite side to that of the engagement surface. A layer of insulator 104 is provided on the engagement surface such that the sensor 101 is in engagement or connected with the substrate 200 via at least the insulator 104. The aforesaid laminated structure may include the layer of insulator 104 and all are contained in a housing 105. The housing 105 includes a support 106 which acts as a stand for supporting and affixing the laminated structure on the substrate 200. The housing 105 sealingly encloses and protects the sensor 101 and detector 102, so that detection is possible and will continue even under extreme weather or adverse environmental conditions.

As a particular example where the substrate 200 is a flexible barrier such as a net or a fence, in normal circumstances the sensor 101 resonates at a first frequency. When there is a structural change 300, the sensor 101 will resonate in a different second frequency. The difference in resonant frequency indicates the structural change 300, for example corrosion in the form of rust. The magnitude of the frequency change may be useful to indicate the extent of corrosion on the net or fence 200 and/or its position relative to that of the laminated structure. In general, the resonant frequency of the sensor 101 reduces with an increase in the thickness of the rust.

A second aspect of the invention relates to a method of detecting structural change 300 in/on the substrate 200. The method comprises the steps of:

providing the detection system 100 as detailed above on a substrate 200, detecting the resonant frequency of the sensor 101 by the detector 102, transmitting detected information from the detector 102 to the receiving device 103, preparing an analyzing device which is preferably an analyzing server 108 by installing a set of reference data, and identifying a change in the resonant frequency of the sensor 101.

The step of preparing the analyzing server 108 may take place at any time before the step of identifying a change in the resonant frequency. To identify a change in the resonant frequency, the analyzing server 108 interprets the change in resonant frequency by comparing it with the reference data, thereby obtaining information of the structural change 300. The structural change 300 includes at least one of position and magnitude of the structural change 300.

By reason of the laminated structure having a relatively small and thin form factor, the detection system 100 is particularly suitable for use in at locations where the initial corrosion area is small. Two or more of the laminated structures along with their respective housings 105 and supports 106 may be arranged at intervals across the substrate 200, all being connected to the same LoRa wireless network as the receiving device 103, which is in turn in LTE wireless communication with the analyzing server 108 for continuous and automated detection. This allows for the detection of structural changes 300 in multiple locations across a wider area of the substrate 200. The receiving device 103 is installed with a LTE (Long-Term Evolution) communication module for mobile communication with the analyzing server 108. A mobile phone running an appropriate app is able to communicate with the analyzing server 108 for at least monitoring the status of structural changes 300 in the substrate 200.

The invention has been given by way of example only, and various other modifications of and/or alterations to the described embodiment may be made by persons skilled in the art without departing from the scope of the invention as specified in the appended claims.

The invention claimed is:

1. A detection system for identifying structural change with a substrate, comprising:

a sensor configured to resonate at a resonant frequency that changes in response to structural change in said substrate;

a detector located in proximity to the sensor for detecting the resonant frequency of the sensor; and a receiving device in communication with the detector for receiving information output by the detector;

an analyzing device in communication with the receiving device for and interpreting information output by the receiving device;

wherein the sensor includes an engagement surface for engaging said substrate, the detector is located on the sensor and away from the engagement surface in such a way that the sensor and the detector are arranged to form a laminated structure.

2. The detection system as claimed in claim 1, wherein the engagement surface of the sensor engages said substrate via a layer of insulation.

3. The detection system as claimed in claim 2, wherein the sensor, the detector and the layer of insulation are contained in a housing.

4. The detection system as claimed in claim 3, wherein the housing is placed on a support which is placed in direct contact with the substrate.

5. The detection system as claimed in claim 1, wherein the analyzing device is pre-equipped with information for interpretation of the output from the detector.

6. The detection system as claimed in claim 1, wherein the substrate comprises a flexible barrier and the structural change comprises corrosion of the flexible barrier.

7. The detection system as claimed in claim 1, wherein the sensor comprises an antenna sensor.

8. A method of detecting a structural change in substrate, comprising the steps of:

providing the detection system as claimed in claim 1;

detecting the resonant frequency of the sensor by the detector;

transmitting detected information from the detector to the receiving device;

preparing the analyzing device by installing a set of reference data; and identifying any change in the resonant frequency of the sensor by the analyzing device.

9. The method as claimed in claim 8, wherein the analyzing device operatively interprets the change in resonant frequency by comparing it with the reference data, thereby obtaining information or the structural change.

10. The method as claimed in claim 9, wherein the information of the structural change includes at least one of position and magnitude of the structural change.

11. The method as claimed in claim 8, wherein the step of providing the detection system includes placing two or more laminated structures on the substrate at specific intervals apart.

* * * * *